Aug. 27, 1963  G. E. KELLOGG  3,101,742
BRAKE BOOSTER CONTROL VALVE MECHANISM
Filed Aug. 23, 1961  2 Sheets-Sheet 1

INVENTOR
GEORGE E. KELLOGG
BY
HIS ATTORNEY

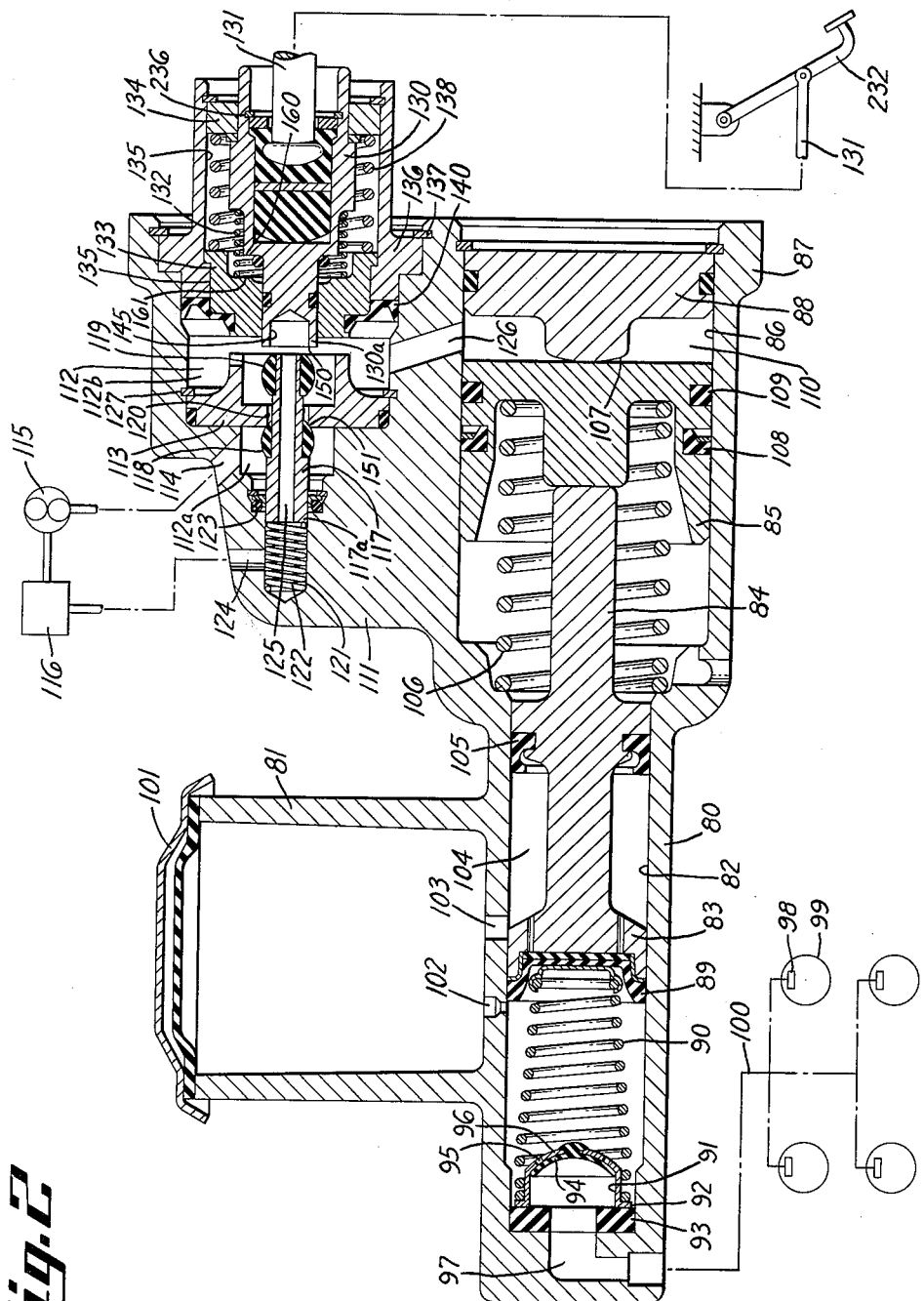

United States Patent Office 3,101,742
Patented Aug. 27, 1963

3,101,742
BRAKE BOOSTER CONTROL VALVE
MECHANISM
George E. Kellogg, Miamisburg, Ohio, assignor to General Motors Corporation, Detroit, Mich., a corporation of Delaware
Filed Aug. 23, 1961, Ser. No. 133,402
2 Claims. (Cl. 137—625.25)

This invention relates to valve mechanisms for fluid pressure operated power units and particularly to a fluid pressure operated brake booster unit.

An object of the invention is to provide an improved control valve arrangement for controlling admission and exhaust of pressurized fluid to and from a fluid pressure operated power unit, particularly a brake booster unit, wherein the valve elements are balanced hydraulically to increase the ease of operation of the control valve mechanism, and to include in such a valve mechanism a resilient diaphragm structure for transmitting a force effect against a manually operated actuating member so as to provide brake "feel" to the operator of the vehicle.

Further objects and advantages of the present invention will be apparent from the following description, reference being had to the accompanying drawings wherein preferred embodiments of the present invention are clearly shown.

In the drawings:

FIGURE 2 is a cross-sectional view of a similar fluid pressure operated brake booster unit but with the control valve mechanism modified and arranged somewhat differently from the structure shown in FIGURE 1.

Figure 1:
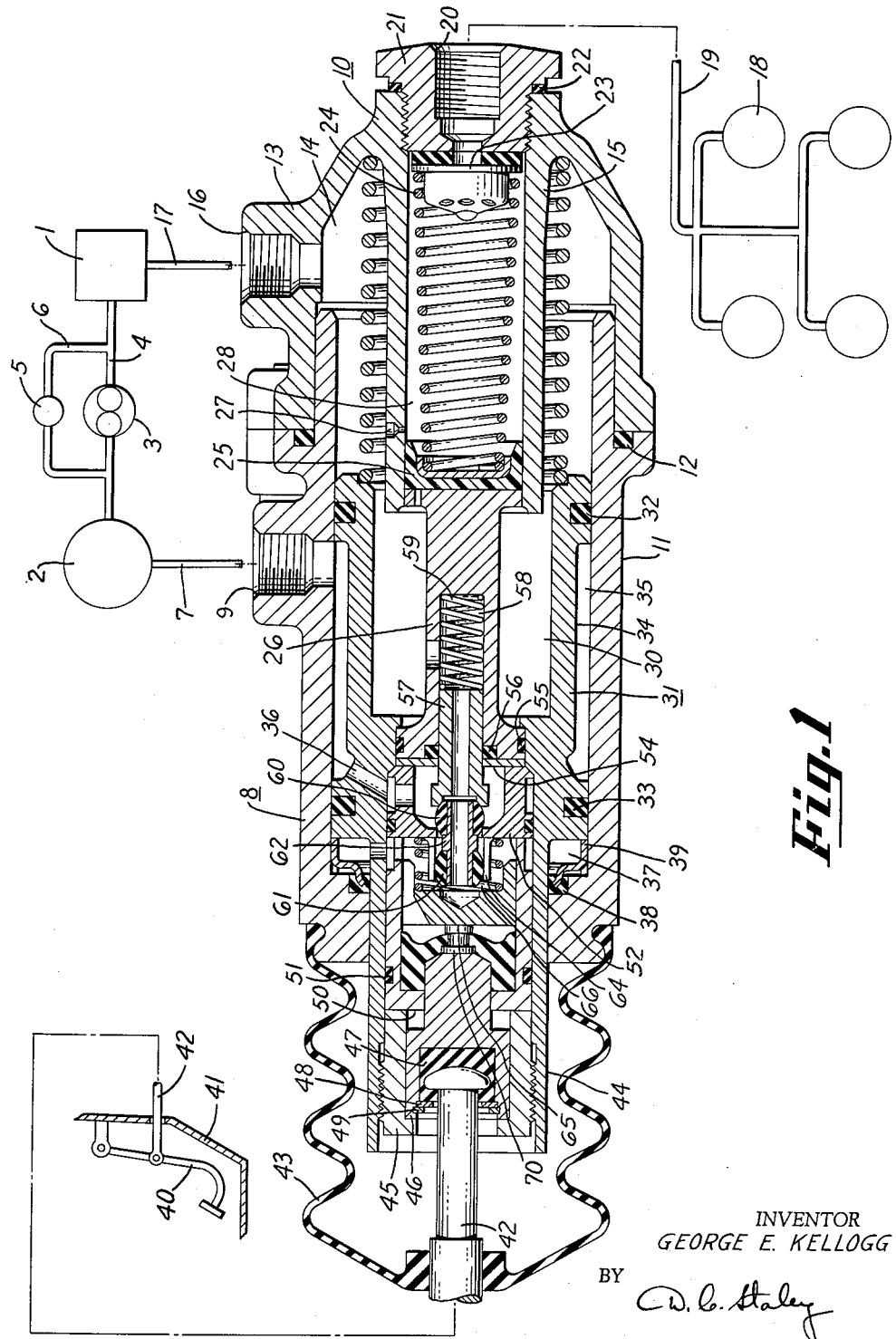
FIGURE 1 is a cross-sectional view of a brake power booster unit actuated by fluid pressure.

This application is a continuation-in-part application of my copending application Serial No. 841,202 filed September 21, 1959, now Patent No. 3,054,387.

In FIGURE 1 the hydraulic power booster unit is illustrated in cross section. The booster unit operates a master piston within a master cylinder which is adapted for pressurizing fluid for the operation of the vehicle brakes. The hydraulic booster unit is manually controlled as indicated by the manual control lever. A source of pressurized fluid is also illustrated for providing the power for operation of the booster unit.

The source of pressurized fluid includes a reservoir 1 for receiving the hydraulic fluid from the hydraulic booster unit. The reservoir is connected by a conduit 4 to an accumulator 2. A hydraulic pump 3 is placed within the conduit 4 connecting the reservoir 1 to the accumulator 2. A bypass valve 5 is placed in a conduit 6 which shunts the fluid pump 3. A conduit means 7 connects the accumulator 2 with the hydraulic booster unit 8 through the inlet port 9.

The hydraulic master cylinder 15 is formed in master cylinder casting 10. The casting 10 is connected to the power cylinder 11 and sealed in this connection by a seal 12. The radially outer portion 13 of the master cylinder casting 10 forms a passage chamber 14 between the radially outer portion 13 and the master cylinder 15 of the master cylinder casting 10. The outer portion 13 is provided with an outlet port 16 in communication with the conduit 17 which is connected to the reservoir 1.

A plurality of brakes 18 are connected by a conduit means 19 to the port 20. The port 20 is formed within the fitting 21 which threadedly engages the forward end of the master cylinder 10. A seal 22 is placed between the fitting 21 and the master cylinder 10. A valve assembly 23 is mounted within the master cylinder for maintaining a residual pressure within the brake actuating fluid system. The valve assembly 23 is held in position by the spring 24 operating against the seal 25.

The seal 25 is mounted on the forward end of the master piston 26. A vent 27 places the chamber 14 external of the master cylinder 15 in communication with the pressurizing chamber 28 within the master cylinder 15. In this manner the pressurized fluid system for operating the hydraulic booster unit is also in communication with the fluid system for actuating the fluid brakes.

The power cylinder 11 is fitted to the external portion 13 of the master cylinder casting 10. The forward end of the power cylinder 11 and the external portion 13 of the master cylinder casting 10 form the chamber 14 providing a reservoir for the master cylinder. Chamber 14 also is in communication with the annular passage 30 to provide passage means for the exhaust fluid from the hydraulic booster unit.

A power piston 31 operates within the power cylinder 11 and is provided with a forward seal 32 and an intermediate seal 33. The master piston is formed with an annular depression 34 forming the annular chamber 35. The chamber 35 forms the inlet passage means between the power cylinder 11 and the power piston 31. The chamber 35 extends about the outer periphery for the greater portion of the power piston 31 to provide communication between the inlet port 9 in the power cylinder 11 and the inlet passage 36 within the power piston 31.

The rearward end of the power piston 31 forms a power chamber 37 with the power cylinder 11. The bore diameter of the rearward end of the power cylinder 11 is reduced to fit the corresponding reduction in diameter of the power piston 31. The rear end of the master cylinder 11 and the master piston 31 are fitted with a seal 38 which is maintained in its position by a retainer ring 39.

The hydraulic booster unit is operated manually by a brake lever 40 which is pivotally mounted on the fire wall 41. A push rod 42 pivotally connects the brake lever 40 and extends centrally into the rearward end of the booster unit 8. A rubber boot 43 fits the outer periphery of the push rod 42 and the rearward end of the power cylinder 11 to provide a sealing means for foreign material between these two relatively moving parts. The rearward end 44 of the power piston 31 is formed of a reduced diameter and extends axially from the power piston 11. The intermediate portion of the power piston 31 has a cylindrical opening extending forwardly from the rear end. A guide 45 threadedly engages the rearward end and inner periphery of the power piston 31. The guide 45 also provides a stop for the rearward end of the actuating block 46. The actuating block 46 receives a rubber button 47 to provide a resilient seat for the forward end of the push rod 42. The button 47 is held in position by a retainer ring 48 and a snap ring 49 within the inner periphery of the actuating block 46. The actuating block 46 is permitted to move forwardly a limited amount under the pressure of the push rod 42 to the point where it engages the rearward surface of the diaphragm seat 50.

The cylindrical opening extending forwardly in the rear end of the power piston 31 also provides a guide means for the diaphragm seat 50. A seal 51 is mounted in an annular recess on the outer periphery of the diaphragm seat 50 and engages the inner periphery of the cylindrical opening in the rearward end of the power piston 31. The diaphragm seat 50 extends forwardly within the cylindrical opening of the power piston 31 to engage the rearward wall of the inlet valve seat 52. The inlet valve seat 52 is also mounted concentrically within the cylindrical opening in the power piston 31.

The master piston 26 is mounted with the forward end operating axially within the master cylinder 15. The rearward end of the master piston 26 extends rearwardly into a concentric opening of the power piston 31. The rearward radial wall of the master piston 26 engages a pressure plate 54 which also contacts the forward wall of the inlet valve seat 52. A seal 55 is mounted about the outer periphery of the rearward end of the master piston 26 and engages the inner periphery of the power piston 31. A second seal 56 is also placed about the inner periphery of the master piston 26 on its rearward end and engages the inlet valve element guide 57. The inlet valve element guide 57 is concentrically mounted within the rearward end of the master piston 26. The inlet valve element guide 57 extends forwardly within a cylindrical opening 58 in the rearward end of the master piston 26 and operates against a spring 59.

The inlet valve element 60 and the outlet valve element 61 are concentrically mounted on a sleeve 62. The inlet valve element 60 is mounted forwardly of the inlet valve seat 52. The inlet valve element 60 is normally contacting the valve seat 52 due to the biasing effect of the spring 59 operating against the inlet valve element guide 57. The inlet valve seat 52 is provided with rearwardly extending fingers 64 to operate as a guide about the outer periphery of the outlet valve element 61. The fingers permit passage of fluid radially outwardly from the intermediate portion of the sleeve 62. The outlet valve seat 65 is concentrically mounted within the diaphragm seat 50. A spring 66 is resiliently mounted between a radial wall on the rearward side of the inlet valve seat 52 and the radial wall on the forward side of the outlet valve seat 65. The spring 66 biases the outlet valve to a normally open position.

As the push rod moves forwardly, the block 46 moves a pin 70 forward thereby closing the outlet valve seat 65 with the valve 61.

The arrangement shown in FIGURE 2 consists of a master cylinder 80 having a fluid reservoir 81 integral therewith. The cylinder 80 has a cylinder bore 82 that receives a master cylinder piston 83 which includes a rearwardly extending stem portion 84 engaged by a power piston 85 that reciprocates in a power cylinder bore 86 of the power cylinder 87. The power cylinder 87 has its open end closed by a closure wall member 88.

The master cylinder piston 83 has a cup seal member 89 on the forward end thereof that is retained against the piston 83 by means of a compression spring 90 positioned between the cup seal 89 and a residual check valve structure 91 at the opposite end of the cylinder bore 82. The spring 90 retains the flanged portion 92 on the rubber seat 93 and the residual check valve structure also includes a rubber flap valve 94 that closes the plurality of openings 95 in the cap portion 96 of the residual check valve so that normally a residual pressure is retained in the outlet passage 97 that connects with the wheel cylinders 98 of the wheel brakes 99 through means of the line conduits 100.

The reservoir 81 is provided with the usual cover cap 101 and is provided with a fill port 102 positioned just ahead of the cup seal 89 when the piston is in the full retracted position as shown in FIGURE 2. The reservoir 81 also includes a port 103 that communicates with the chamber 104 provided between the head of the piston 83 and a secondary seal 105 carried at the rear portion of the piston to prevent cavitation in chamber 104 during operation of the master cylinder piston.

The power cylinder 87 contains a compression spring 106 placed between the end wall of the power cylinder and the power piston 85 to retain the piston against a stop member 107 provided on the closure wall 88 when the power unit is in the retracted position shown in FIGURE 2. The piston 85 is provided with seal members 108 and 109 to prevent loss of hydraulic fluid from the pressure chamber 110 when supplied with fluidized pressure during operation of the power unit.

The control valve mechanism for supplying pressurized fluid to the pressure chamber 110 and for exhausting fluid therefrom consists of a valve housing 111 that is an integral part of the cylinder 87. This housing 111 has a valve chamber 112 separated into two compartments 112a and 112b by a wall member 113. These compartments 112a and 112b can be referred to as first and second compartments, respectively, separated by the wall member 113. The first compartment 112a has an inlet port 114 to receive pressurized fluid from a pump 115 or other suitable source, the pump receiving its fluid from the reservoir 116.

The control valve structure includes a valve carrier member 117 that has a first valve element 118 and a second valve element 119 of generally spherical shape carried thereon in spaced axial relationship, the valve members 118 and 119 being placed at opposite sides of the wall 113 and at opposite sides of the port 120 that interconnects the chambers 112a and 112b. The valve carrier 117 is slidably received in a bore 121 provided in the valve housing 111 and is biased by the compression spring 122 placed in the bore 121 to urge the valve element 118 against the opening 120 to close fluid connection between compartments 112a and 112b. A fluid seal 123 is provided around the valve carrier 117 to prevent loss of fluid under pressure from the chamber 112a. An exhaust port 124 connects with the bore 121 for return of fluid to the reservoir 116.

The valve carrier 117 has an axial bore 125 extending the length of the same to interconnect chambers 112a and 112b when the valve mechanism is in the position illustrated in FIGURE 2. This in turn connects the working chamber 110 of the power unit with the exhaust port 124, a passage 126 being provided between the working chamber 121 and the chamber 112b of the control valve mechanism for the interconnection of the working chamber 110 with the exhaust valve port of the control valve mechanism.

The wall member 113 is held in place by a snap ring 127.

The valve carrier and valve elements thereon are operated by a plunger member 130 that in turn is actuated by a member 131 suitably connected with the brake pedal 232 so that when brake pedal 232 is moved downwardly for applying the brakes the plunger 131 is moved forwardly, that is to the left, as viewed in FIGURE 2, to move the plunger member 130 to the left.

The plunger member 130 is normally retained in the position shown in FIGURE 2 by means of a compression spring 132 placed between the piston member 133 and the plunger member 130 to hold it against the wall member 134 that is held in the bore 135 by means of a snap ring 236.

The forward end of the plunger member 130 has a reduced diameter portion 130a that is slidable in the piston member 133 which in turn is slidable in the bore 135 provided in the closure wall member 136 held in place in the valve housing by means of the snap ring 137. The compression spring 138 is placed between the piston member 133 and the wall 134 normally to retain the piston member in the position shown in FIGURE 2 when the brakes are in released or retracted position.

The forward end of the piston member 133 receives the inner peripheral portion of a diaphragm 140 with the outer peripheral portion thereof engaging the closure wall member 136 thereby preventing fluid pressure from exhausting from chamber 112b and also providing means by which fluid pressure acting on the surface of diaphragm 140 can urge the piston member 133 against the spring 138 with the piston 133 and plunger member 130 ultimately engaging one another so that fluid pressure acting on the member 133 is transmitted to the plunger member 130 thereby providing a force effect applied to the plunger 131 in opposition to forward manual movement thereof which functions as "feel" to the operator applying the brakes through the brake pedal arrangement 232.

The reduced diameter portion 130a of the plunger member 130 has an axial bore 145 that is the same diameter as the opening 120 and is of the same diameter as the outside diameter of the valve carrier 117 in that portion thereof which is slidable in the housing 111.

In operation, when the brake pedal 232 is moved downwardly, the plunger member 131 moves forward, that is to the left as viewed in FIGURE 2, to move the plunger member 130 in a leftward direction until the seat 150 formed by the inner corner edge of the bore 145 engages the valve element 119, thereby closing off the axial passage 125 in the valve carrier from connection with chamber 112b and thereby closing off the work chamber 110 with the exhaust port 124. Further advancement of the plunger member 130 will then unseat the valve element 118 from its seat 151 at the corner edge of the opening 120 so that fluid pressure standing in chamber 112a will pass through opening 120 in the wall 113 for delivery into the chamber 112b and thence through port 126 into the working chamber 110 of the power unit. Fluid pressure being delivered into the chamber 110 of the power unit will cause the piston 85 to move forwardly and thereby move the master cylinder piston 83 in a forward direction to effect delivery of fluid under pressure into the wheel cylinders 98 of the brakes and apply the brakes thereby.

In the control valve structure just described, it will be noted that the inner diameter of the bore 145 is the same as the diameter of the opening 120 and is also the same as the outside diameter of the end portion 117a of the valve carrier 117. It will also be noted that both valve elements 118 and 119 have the same diameter in their spherical shape.

Thus, when the valve carrier and the valve elements thereon are in the position shown in FIGURE 2 with valve element 118 engaging its valve seat 151 and with valve element 119 disengaged from its valve seat 150, the fluid pressure acting on the valve element 118 in the chamber 112a will apply force effect on opposite sides of the valve element 118 in axial opposite direction, which forces are balanced because of the equal diameter of the opening 120 at the valve seat 151 and that of the end portion 117a of the valve carrier. Thus, opposing and equal forces are working on the valve element 118 which balances the valve so that only spring 122 is that which is effecting the closing of the valve in the position shown in FIGURE 2.

Also, at this time, it will be noted that since the end area of the portion 117a of valve carrier 117 is equal to the exposed end portion of the valve element 119 that any fluid pressure existing in chamber 112b will have equal and opposite effect on the exposed areas of the spherical valve element so that the force effect on the valve carrier is a balanced condition.

When the plunger 130 is moved forward to effect engagement of valve seat 150 with the valve 119, it will be noted that the area of the spherical valve element 119 on the right-hand side thereof will be equivalent to the area of the spherical element 118 on the left-hand side thereof, so that fluid pressure working on these two areas effects axial forces that are equal and opposite to balance the axial force effect on the valve carrier 117. Also, since at this time the valve element 118 will be disengaged from its valve seat 151, the area of the valve element 118 on its right-hand side is equivalent to the area of valve 119 on its left-hand side so that the force effect is a balance condition as far as axial thrust is concerned on the valve elements, thereby resulting in a fully balanced valve member.

Also, when the valve seat 150 engages the valve element 119 on its right-hand side, the area of the valve element 119 exposed to any pressure existing in the passage 125 is equivalent to the end area of the carrier member 117 on its left-hand end since the diameter of the recess 145 is the same as the outside diameter of the end portion 117. Therefore, the axial force effect of fluid pressure existing in passage 125 is equal and opposite on the valve carrier to balance the valve against axial movement.

From the foregoing description, it will be apparent that the valve carrier and valve elements 117, 118 and 119 are constructed and arranged to provide for balance of forces on the structure to prevent axial movement of the valve carrier when the valve element 118 is in the position shown in FIGURE 1 or when plunger member 130 engages valve element 119.

The arrangement is such as to provide for ease of operation of the valve member and prevent any undue unbalance of forces being effective to either hold the valve closed or hold it open depending upon which direction the fluid is applied upon the valve.

When fluid pressure exists in chamber 112b, this pressure also acts on the face of diaphragm 140 so that the piston 133 is urged to move in a right-hand direction against the force effect of springs 132 and 138, the force effect of spring 132 being applied to the plunger member 130 which in turn acts against the force effect of the operator of the vehicle moving the pedal 232 to provide a brake "feel" during the initial portion of the apply stroke of the device. However, when the plunger member 130 is moved forwardly to effect operation of the valve elements 118 and 119 in the manner heretofore described, the radial face 160 on plunger 130 will ultimately engage radial face 161 on the piston 133 to provide direct contact and thereby provide for a direct force effect to be applied from piston 133 to plunger 130 in proportion to the diaphragm area engaging the piston 133 to provide a brake "feel" to the operator of the vehicle.

While the embodiment of the present invention as herein disclosed constitutes a preferred form, it is to be understood that other forms might be adopted.

What is claimed is as follows:

1. In a pressure operated power unit, a valve control mechanism, comprising, a housing having a chamber therein, a first wall member dividing said chamber into first and second compartments and having an opening therein for interconnection of the two compartments, said first compartment having a fluid pressure inlet port, a valve carrier slidable in said housing and having a first and second valve element spaced axially thereon and positioned at opposite sides of said first wall member in said first and second compartments respectively, said valve carrier having a passage therein connecting said second compartment with a fluid pressure exhaust port, resilient means biasing said carrier to engage said first valve element on said first wall member to close said opening therein against outflow of pressure fluid from said first compartment with said second valve element being spaced thereby from said first wall member, said housing having a second wall member movable therein axially of said valve carrier, means biasing said second wall member toward said first wall member, diaphragm means in said second compartment between said housing and said second wall member and exposed to fluid pressure in said second compartment to move thereby said second wall member away from said first wall member against the force of said biasing means, and actuated plunger means slidable in said second wall member engageable with said second valve element to close said passage in said valve carrier and move the same thereby to disengage said first valve element from said first wall member and open thereby said opening therein for fluid pressure flow from said first compartment to said second compartment, and resilient means normally biasing said plunger away from said second valve element for interconnection of said second compartment with said exhaust port through said passage in said valve carrier.

2. Apparatus constructed and arranged in accordance with the structure set forth in claim 1 wherein said second wall member is moved against said actuated plunger by said diaphragm means on fluid pressurization of said second compartment to provide thereby a positive force effect on said actuated plunger in opposition to the force effect actuating said plunger.

References Cited in the file of this patent
UNITED STATES PATENTS

| | | |
|---|---|---|
| 2,752,947 | Hruska | July 3, 1956 |
| 2,920,859 | Holmes | Jan. 12, 1960 |
| 2,931,620 | Burns | Apr. 5, 1960 |
| 2,997,028 | Ayers | Aug. 22, 1961 |